(12) United States Patent
Fraser et al.

(10) Patent No.: US 12,429,030 B2
(45) Date of Patent: Sep. 30, 2025

(54) TURBINE MONITORING AND MAINTENANCE

(71) Applicant: COGNITIVE.BUSINESS LTD, London (GB)

(72) Inventors: Christopher Fraser, London (GB); Thomas Humphries, London (GB); Ty Burridge-Oakland, London (GB)

( * ) Notice: Subject to any disclaimer, the term of this patent is extended or adjusted under 35 U.S.C. 154(b) by 588 days.

(21) Appl. No.: 17/776,701

(22) PCT Filed: Nov. 11, 2020

(86) PCT No.: PCT/GB2020/052863
§ 371 (c)(1),
(2) Date: May 13, 2022

(87) PCT Pub. No.: WO2021/094743
PCT Pub. Date: May 20, 2021

(65) Prior Publication Data
US 2022/0397097 A1     Dec. 15, 2022

(30) Foreign Application Priority Data

Nov. 14, 2019  (GB) ..................................... 1916603

(51) Int. Cl.
*F03D 17/00*    (2016.01)

(52) U.S. Cl.
CPC .......... *F03D 17/00* (2016.05); *F05B 2260/80* (2013.01); *F05B 2270/32* (2013.01);
(Continued)

(58) Field of Classification Search
CPC . F03D 17/00; F05B 2260/80; F05B 2270/335
(Continued)

(56) References Cited

U.S. PATENT DOCUMENTS

| 8,924,162 B2 | 12/2014 | Lapira et al. |
| 10,260,481 B2 * | 4/2019 | Wilson .................. F03D 7/0224 |

(Continued)

FOREIGN PATENT DOCUMENTS

| CN | 102102626 A | 6/2011 |
| CN | 109458305 A | 3/2019 |

(Continued)

OTHER PUBLICATIONS

Combined Search and Examination Report for Great Britain Patent Application No. 1916603.2 (dated Apr. 7, 2020).
(Continued)

*Primary Examiner* — Ricky Go
(74) *Attorney, Agent, or Firm* — Joseph M. Noto; Bond Schoeneck & King PLLC

(57) ABSTRACT

The present invention related to non-thermal renewable energy turbines (20,24,34,38,40), in particular to the monitoring of turbine performance to identify a loss of performance indicative of faults or component degradation. The method involves comparison of measured power from a target turbine (20) with a predicted value for same turbine. The predicted value is calculated using the output from a plurality of other turbines (24,34,38,40) from an array and a predictive model including weightings for the other turbines (24,34,38,40) based on the strength of correlation of their historical with historical data from the target turbine (20).

17 Claims, 9 Drawing Sheets

(52) U.S. Cl.
CPC ... *F05B 2270/321* (2013.01); *F05B 2270/335* (2013.01); *F05B 2270/404* (2013.01); *F05B 2270/709* (2013.01)

(58) Field of Classification Search
USPC .......................................................... 702/34
See application file for complete search history.

(56) References Cited

U.S. PATENT DOCUMENTS

| | | | |
|---|---|---|---|
| 11,639,711 | B2 | 5/2023 | Motto et al. |
| 2011/0313726 | A1* | 12/2011 | Parthasarathy ......... F03D 80/50 702/179 |
| 2012/0101644 | A1* | 4/2012 | Evans .................. G05B 13/026 700/287 |
| 2012/0271593 | A1* | 10/2012 | Uluyol .................... F03D 7/048 702/182 |
| 2014/0025354 | A1 | 1/2014 | Padullaparthi |
| 2018/0320658 | A1* | 11/2018 | Herzog ................... F03D 7/045 |
| 2018/0335019 | A1* | 11/2018 | Knudsen ............ G01R 21/1331 |
| 2021/0101644 | A1 | 4/2021 | Nadesan et al. |

FOREIGN PATENT DOCUMENTS

| | | |
|---|---|---|
| EP | 3221579 A1 | 8/2015 |
| EP | 3252556 A1 | 12/2016 |
| EP | 3263889 B1 | 1/2018 |
| EP | 3407271 A1 | 11/2018 |
| WO | 18204524 A1 | 11/2018 |
| WO | 1912231 A1 | 12/2018 |

OTHER PUBLICATIONS

International Search Report and Written Opinion for PCT/GB2020/052863 (mailed Jan. 28, 2021).

* cited by examiner

TURBINE MONITORING AND MAINTENANCE

This application claims the benefit of International Patent Application No. PCT/GB2020/052863, filed Nov. 11, 2020, which claims priority to Great Britain Patent Application No. 1916603.2, filed Nov. 14, 2019, all of which is hereby incorporated by reference their entirety.

The present invention relates to non-thermal renewable energy turbines. In particular, the invention relates to the monitoring of turbine performance to identify degradations in performance which are indicative of faults or component degradation.

The depletion of, and environmental concerns around, fossil fuels are leading to increased consideration of renewable energy supplies, such as solar, wind, hydro, tidal, and wave power.

One of the wind sector's most substantial and largely unsolved challenges is the cost-effective monitoring and tracking of wind turbine performance through the life of the turbine. Remediable undetected faults or component degradation can lead to a significant reduction in efficiency, and therefore energy yield, as well as increasing the risks of terminal failure of components or entire turbines. The associated maintenance costs and downtime of turbines can also be a significant problem for operators, and the associated uncertainty in availability is undesirable for energy companies and end users, particularly since renewables are inherently more susceptible to fluctuations in supply than conventional thermal energy sources. It is therefore important that any performance losses are detected as early as possible to mitigate the risk from these issues.

One approach to performance monitoring is commonly referred to as power curve analysis. The manufacturer-provided power curve for a wind turbine indicates the expected power output for a given wind speed. As the turbine components deteriorate, the efficiency with which wind energy is converted to electrical energy decreases and the performance of the turbine decreases. A comparison of the measured power with the power curve for a given turbine should, therefore, provide a measure of a wind turbine's performance and an indicator of overall turbine health, with many failures and performance degradation mechanisms detectable in the measured power curve using Supervisory Control and Data Acquisition (SCADA) system data.

However, the Original Equipment Manufacturer (OEM) power curve is an idealised model and is not site-specific. The actual power curve may deviate from the nominal one due to site-specific factors, complex wind regimes, or changes in component conditions. Complex terrain and different meteorological conditions, such as varying wind direction, wind shear, and turbulence intensity (e.g. wake effects from other turbines in the array at certain wind directions) can all influence real-world performance, making it difficult to ascertain a turbine's health. A further problem is that the anemometers (the most common instruments used for wind speed measurement) are typically crude mechanical devices and generally provide inaccurate wind speed data. The citing or positioning of anemometers on wind turbines can further reduce the accuracy and precision of the readings taken, especially as standard wind turbine design all but dictates that the anemometer will be located downstream of the turbine blades. The net effect is that the readings obtained are highly unreliable, meaning that performance changes below 10-12% cannot be reliably determined. Owner operators have stated that undetected performance losses in this range can equate to a mean yield loss of around 4% across their fleet.

More accurate wind speed measurement can be achieved through the use of a LASER based wind speed instrument, commonly referred to as LIDAR. LIDAR measurements are able to provide errors as low as 1% in ideal conditions, but in practical applications 3-5% is more typical. This is a meaningful improvement over conventional anemometer readings, but is still far from ideal if degradation is to be detected at an early stage so that maintenance can be planned, and failures prevented, as efficiently as possible. LIDAR equipment is also significantly more expensive than the conventional anemometer device and is more susceptible to damage in potentially hostile outdoor environments of the types where wind farms would typically be located. This can further increase ongoing running and maintenance costs for the wind farm.

It would clearly be beneficial if a system were able to provide a more accurate and reliable monitoring of turbine performance to provide earlier indications of failure or deterioration. Improved monitoring would lead to improved overall performance by helping to detect even small performance losses so that the causes can be remedied sooner. Further potential benefits of reduced maintenance costs, reduced or better scheduled downtime and the consequential improved efficiency and consistency of supply would also increase the viability of wind turbine use.

At the core of the invention is a predictive model for determining performance changes in a turbine by measuring power output from a plurality of renewable energy turbines in an array, and performing a comparison of the measured power output from a target turbine with a predicted value for the target turbine, wherein the predicted value is the result of a calculation based on the measured power output from a plurality of other turbines from the array and a predictive model including a weighting assigned to each of the plurality of other turbines based on the strength of correlation of their historical data with historical data from the target turbine.

The predicted value may be compared to measured values of power output for the target turbine to determine whether a significant performance change for the target turbine has occurred. An alert signal may be output indicative of a fault or component degradation if a significant performance change is determined.

The weighting referred to herein may be generally described/defined as comprising a mathematical function.

The weighting assigned to each of the plurality of other turbines may be one of a plurality of weightings assigned to each of the plurality of other turbines, perhaps throughout a multi stage process within the predictive model. As such, the overall effect on each of the plurality of turbines may resemble a complex function, or weighting-based function, rather than a simple/singular weighting.

Although an initial determination of weightings is related to the correlation strengths, further processing within the predictive model can result in individual turbines having final weightings that are unrelated to their correlation strength with a target turbine. For example, a strongly correlated turbine may ultimately have a low or even negative weighting, although the ultimate weighting has been derived from/using the initial weighting.

According to a first aspect of the invention there is provided a method for turbine fault or component degradation detection as defined in the appended claim 1. Further optional features are recited in the associated dependent claims.

The determination of a performance change may be based on a predetermined absolute or percentage difference between the measured power output and the predicted value for a target turbine. If a negative performance change is determined, then this indicates that there has been a decline in performance indicative of a fault or component degradation in the target turbine.

In the context of this application, "array" is taken to mean a defined selection of turbines under consideration, not necessarily a single geographical group or cluster. For example, an array may include selected turbines in different geographical locations but experiencing similar conditions in use.

The method and model allow an assessment of wind turbine performance that is independent of wind speed, and concentrates instead on relative power output, thus removing the problematic anemometer error that impacts power curve analysis. The method may not require wind speed as an input at all, e.g. avoiding reliance on accurate wind speed measurements. Direct power measurement during the operational life of wind turbines connected to electricity distribution networks is mandated within the industry, and so monitoring power output is possible without any additional sensors. The readings of power output from turbines are highly accurate and provide a true reflection of overall turbine performance.

Improved monitoring of wind turbine performance and fault detection can help to support warranty claims, support turbine commissioning activities, and improve asset health through optimised operations and maintenance activities.

An alternative known monitoring method, known as turbine-twinning, also removes the reliance on anemometer readings by comparing power output from a pair of adjacent turbines. However, turbine-twinning requires clean air, and as a result is limited to turbines located on the edge of an array and only under certain wind directions, timeframes, and power zones.

The methodology of the present invention takes a novel step to overcome the limitations of clean air turbine-twinning by learning the repeatable, yet hidden, information generated by a full array of turbines. Through the method and model a predicted power output can be created for any given turbine within the array, with a residual between the actual and predicted power output acting as an indicator of performance change on the turbine.

The method of the invention may further comprise a step of scheduling repair, maintenance or inspection of the target turbine based on the alert signal.

A separate predictive model may be provided for each of a plurality of defined wind directions, and the method may select the predictive model that corresponds to the wind direction experienced by the target turbine. Each of the plurality of other turbines may be assigned a plurality of weightings corresponding to the plurality of defined wind directions.

The plurality of wind directions may be defined as a predefined number of equal or unequal segments of a circle, to define a 'wind rose' with separate 'bins' for grouping data from a defined range of wind directions.

The calculation may be performed using a deep neural network, or using simple multivariate regression, random sample consensus, or regression trees.

The plurality of other turbines may include all other turbines in the array, or may comprise only a subset of other turbines in the array. The subset may be determined based on correlation strength, for example using a predetermined threshold based on $R^2$ value.

The calculation may be independent of wind speed and/or devoid of wind speed measurement data.

The method may further comprise an initial step of training the predictive model using historical data for the target turbine and for the plurality of other turbines. An iterative process may be used to run predictions from historical data and compare with historical measured power, tuning the weightings in the model to reach a predetermined threshold error value.

A second aspect of the invention provides a system comprising an array of renewable energy turbines and one or more processors arranged to receive signals indicative of power output from a plurality of turbines in the array, wherein the one or more processors perform a comparison of the indicated power output from a target turbine with a predicted value for the target turbine, wherein the predicted value is the result of a calculation based on the indicated power output from a plurality of other turbines from the array and a predictive model which includes a weighting assigned to each of the plurality of other turbines based on the strength of correlation of their historical data with historical data from the target turbine, and determine a performance change for the target turbine based on the comparison.

The system may be as defined in the appended claim 11. Further optional features are recited in the associated dependent claims.

The system may further comprise a data store for storing historical data. The data store and/or the one of more processors may be remote from the array of turbines.

The one or more processors and/or the data store may be part of a mobile device or alternative remote monitoring unit, and may have wired or wireless communication with each other and/or one or more turbines in the array. Alternatively, the one or more processors and/or the data store may be integrated with the array.

The system may implement method steps as defined in relation to the first aspect of the invention.

Also provided is a turbine monitoring unit as defined in the appended claim 15 and a data carrier as defined in the appended claim 16.

According to a further aspect there is provided a turbine monitoring unit having one or more processors arranged to receive signals indicative of power output from a plurality of renewable energy turbines in an array, wherein the one or more processors perform a comparison of the indicated power output from a target turbine with a predicted value for the target turbine, wherein the predicted value is the result of a calculation based on the indicated power output from a plurality of other turbines from the array and a predictive model which includes a weighting assigned to each of the plurality of other turbines based on the strength of correlation of their historical data with historical data from the target turbine, and determine a performance change for the target turbine based on the comparison.

According to another aspect there is provided a data carrier comprising machine readable instructions for the operation of one or more processors essentially to receive signals indicative of power output from a plurality of turbines in an array, perform a comparison of the indicated power output from a target turbine with a predicted value for the target turbine, wherein the predicted value is the result of a calculation based on the indicated power output from a plurality of other turbines from the array and a predictive model which includes a weighting assigned to each of the plurality of other turbines based on the strength of correlation of their historical data with historical data from the target turbine, and determine a performance change for the target turbine based on the comparison.

The turbine monitoring unit may comprise a data store as defined in the second aspect of the invention.

The turbine monitoring unit may be as defined in the appended claim 15 and the data carrier may be as defined in the appended claim 16.

The data carrier may comprise a computer memory device or data store medium.

The monitoring unit or the data carrier may implement method steps as defined in relation to the first aspect.

The measured power may be averaged over a set time period to accommodate fluctuations from, for example, gusts experienced by wind turbines.

Practicable embodiments of the invention are described in further detail below with reference to the accompanying drawings, of which:

FIG. 1A schematically shows a pair of turbines exposed to a first wind direction;

FIG. 1B is a graph plotting the power output of first turbine against the power output of the second turbine in FIG. 1A;

FIG. 2A schematically shows a pair of turbines exposed to a second wind direction;

FIG. 2B is a graph plotting the power output of first turbine against the power output of the second turbine in FIG. 2A;

FIG. 3 schematically shows an array of wind turbines;

As suggested above, interference of other turbines in an array is a significant problem for conventional turbine-twinning. The method requires turbulence-free data, so useful data is only available when turbines aren't interfering with each other. Only turbines at the edge of an array experience reliable clean air flow, and even then only for certain wind directions.

Because of the abovementioned drawbacks, the turbine-twinning approach is most typically used when deciding whether to fit an upgrade such as a vortex generator. The operator needs to know if the increase in performance will outweigh the price of the upgrade. Instead of paying for the whole site at once, the upgrade can be installed on a single turbine at the edge of the array and the performance can be analysed over a few months simply to compare the turbine's power output with its neighbour for clean air wind directions. The drawbacks of turbine-twinning can be easily mitigated in this type of assessment because data for other wind directions can be ignored for the period of the assessment, and the turbine pair can be selected to face the prevailing wind direction. Significant problems arise, however, when applying the turbine-twinning approach to turbine monitoring more generally.

Figure 1A:
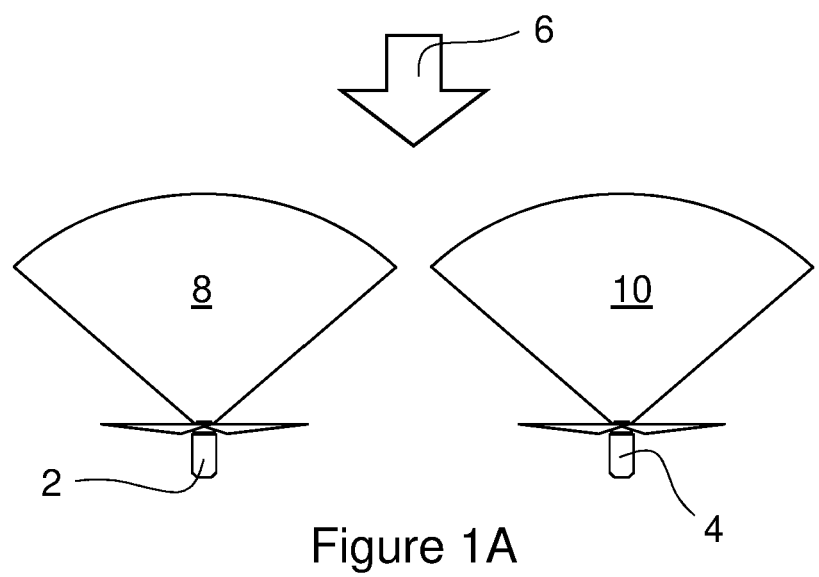
Figure 1B:
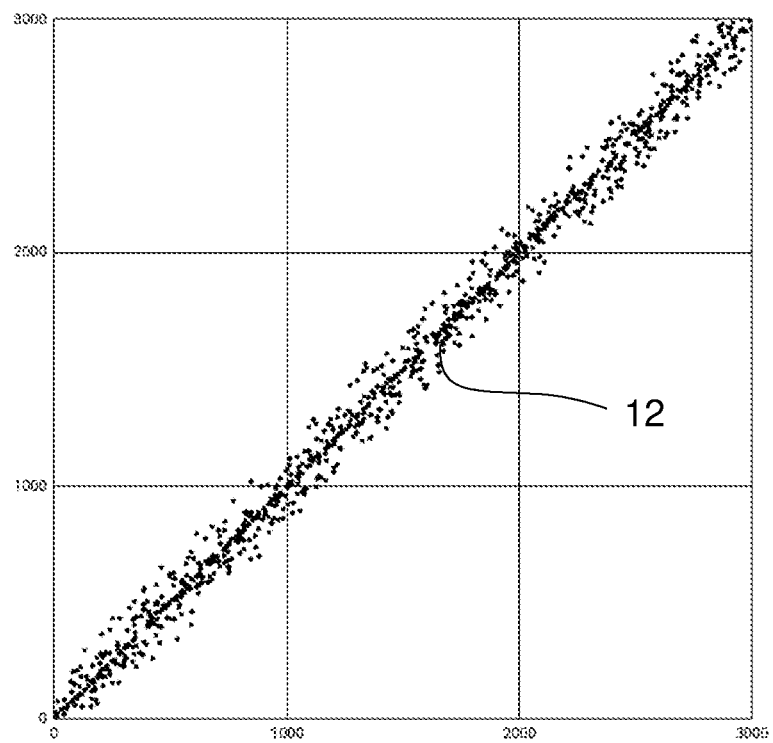

For example, FIG. 1A schematically shows an isolated pair of turbines 2,4, experiencing wind 6 from the North. In the example of FIG. 1A it should be assumed that there is open sea to the North, such that there is nothing to interrupt the clean airflow 8,10 to either the first turbine 2 or the second turbine 4. The strong correlation of data 12 between the two turbines 2,4 is shown in FIG. 1B, indicating that the pairing of these two turbines 2,4 provides a useful comparison tool in the conditions shown. The lack of any offset shows that both turbines 2,4 are providing substantially the same power output, suggesting that there are no faults, component degradation, or operational concerns.

Figure 2A:
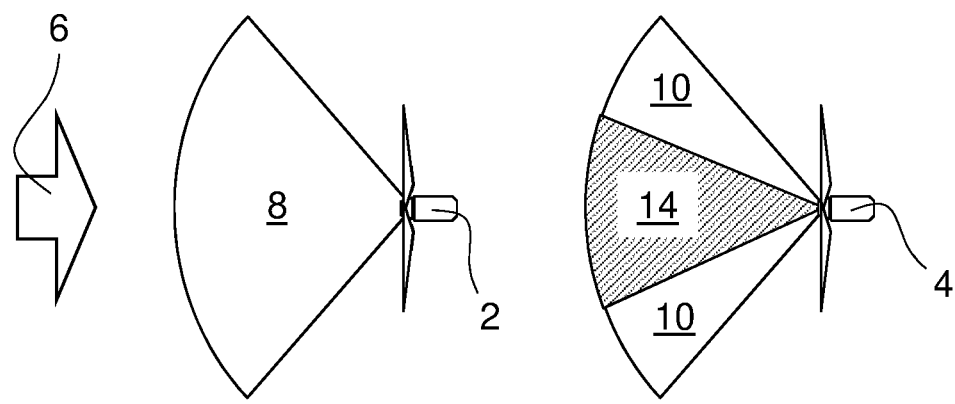
Figure 2B:
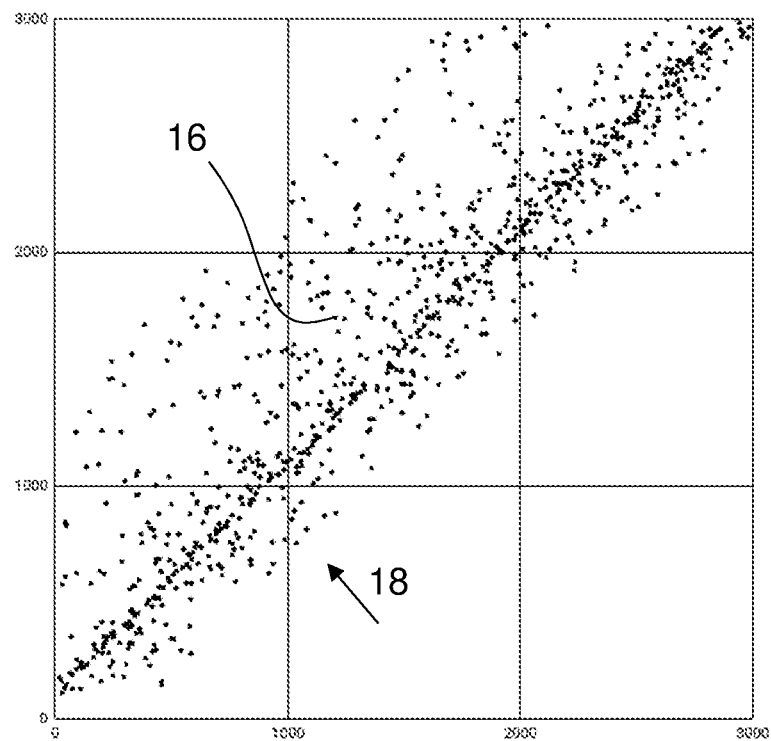

The same two turbines 2,4 are shown in FIG. 2A, but this time with the wind 6 from the West. Under these conditions, the first turbine 2 generates a turbulent wake that disturbs the airflow to the second, downstream, turbine 4. The result of these wake effects is a turbulent region or segment 14 in the airflow 10 reaching the downstream turbine 4. This contrasts with the uninterrupted clean airflow 8 experienced by the upstream turbine 2. The correlation of power output data 16 between these same two turbines 2,4, as shown in FIG. 2B, is noticeably weaker for this alternative wind direction, because of the wake effects. There is also an apparent offset 18 in the data 16, in favour of the first turbine 2, indicating a lower power output from the second turbine 4. However, there is no easy way to determine whether this is indicative of a fault or component degradation in the second turbine 4 or simply a result of the upstream obstruction and turbulent airflow 14 provided to the second turbine 4.

It will be understood that an East wind would likely result in similarly poor correlation with an opposite offset, because the first turbine 2 would suffer wake effects as a result of being downstream from the second turbine 4.

Even from this simplified example, it can be seen that a simple pairing or twinning of adjacent wind turbines cannot be relied upon to provide a reliable comparison for fault or component degradation detection unless the wind is from a particular direction.

This becomes far more problematic when we consider a complete array of turbines, for example in a commercial wind farm. Even if we limit the consideration to turbines on the edge of the array, turbulent airflow from adjacent turbines in the array would further diminish the effectiveness of any prediction. For turbines within the array, for example as shown in FIG. 3, there is almost no 'clean' airflow regardless of the prevailing wind direction.

Figure 3:
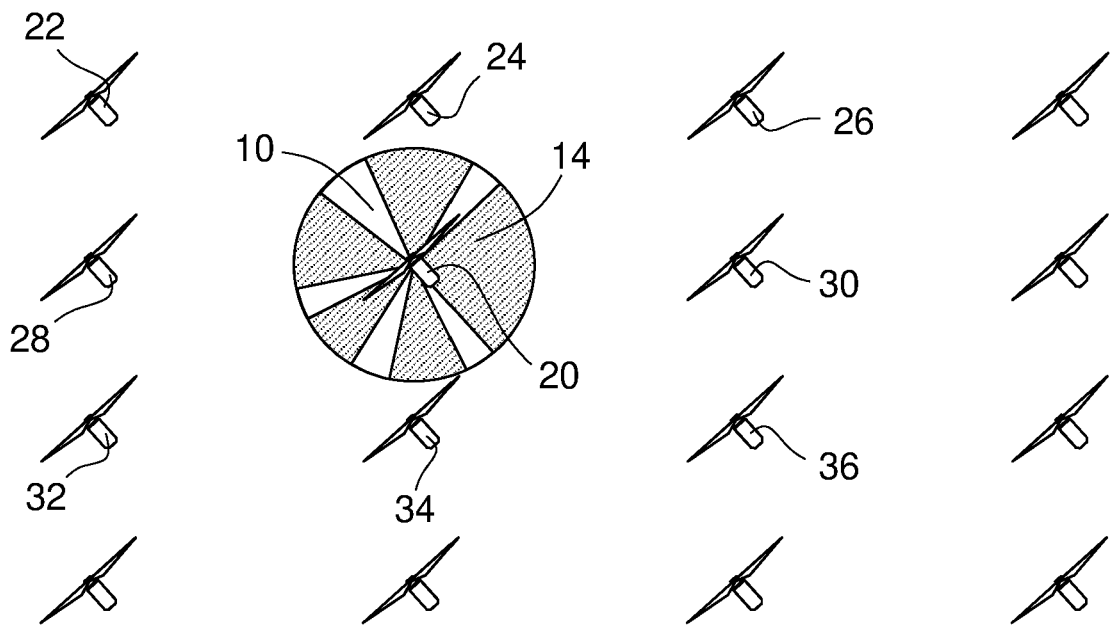

FIG. 3 shows a larger array of turbines, with the clean and turbulent/obstructed airflow for a selected or target turbine 20 is schematically illustrated. The selected turbine 20 is within the array and is completely surrounded by neighbouring turbines 22,24,26,28,30,32,34,36. As a result, turbulent airflow 14 will be experienced by the selected turbine 20 from the majority of wind directions, with only a few smaller sectors 10 providing clean unobstructed airflow. Conventional turbine-twinning is, therefore, not a viable approach for monitoring the performance of the selected turbine 20.

In contrast, the present invention provides a system to reliably detect performance differences regardless of turbine position within an array or prevailing wind direction. The system addresses these shortcomings in known systems by moving away from the conventional approaches of considering an individual turbine (as in power curve analysis) or a neighbouring pair of turbines (turbine-twinning), and instead taking a more global view of the array under consideration. The method relies on turbine-turbine power relationships across an entire array, for all wind directions, to create a prediction of power output for a given turbine.

An N-dimensional turbine-turbine power model is created to obtain highly correlated relative power from every wind direction and for every turbine to all others across a wind farm or localised turbine array.

Figure 4:
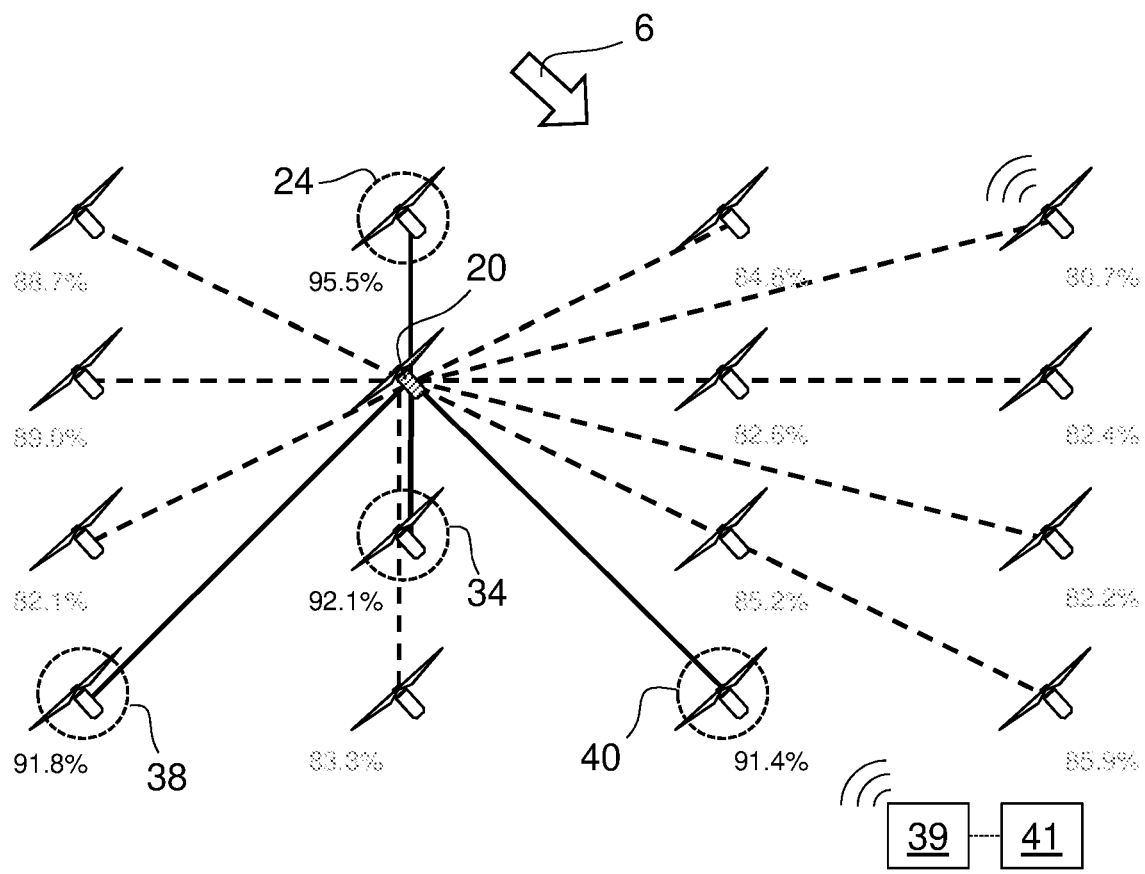
FIG. 4 shows the correlation strength between power output data of a selected turbine in the array of FIG. 3 with all other turbines in the array for a third wind direction.

The example of FIG. 4 illustrates correlation strengths for the selected turbine 20 and all other turbines in the example localised turbine array with a wind direction 6 from the North West. The correlation strength is given as a percentage value in each case, with higher values indicating a stronger or better correlation between the data for each pair of turbine power outputs. In the example, the values show that there is strong correlation for all turbines across the entire array. However, the four turbines 24,34,38,40 showing the strongest correlation have been highlighted for reference.

FIG. 4 also schematically illustrates a monitoring unit 39, comprising one or more processors, for receiving and processing data signals from the turbines in the array. As illustrated, the monitoring unit 39 is a remote unit communicating wirelessly with the turbines, but wired connections are also possible. A data store 41 is shown associated with the monitoring unit 39. In some embodiments a single entity will comprise the data store 41 and one or more processors 39. Alternatively, the data store 41 may be separate from the one or more processors 39 and may communicate by wired or wireless data transfer.

Figure 5:
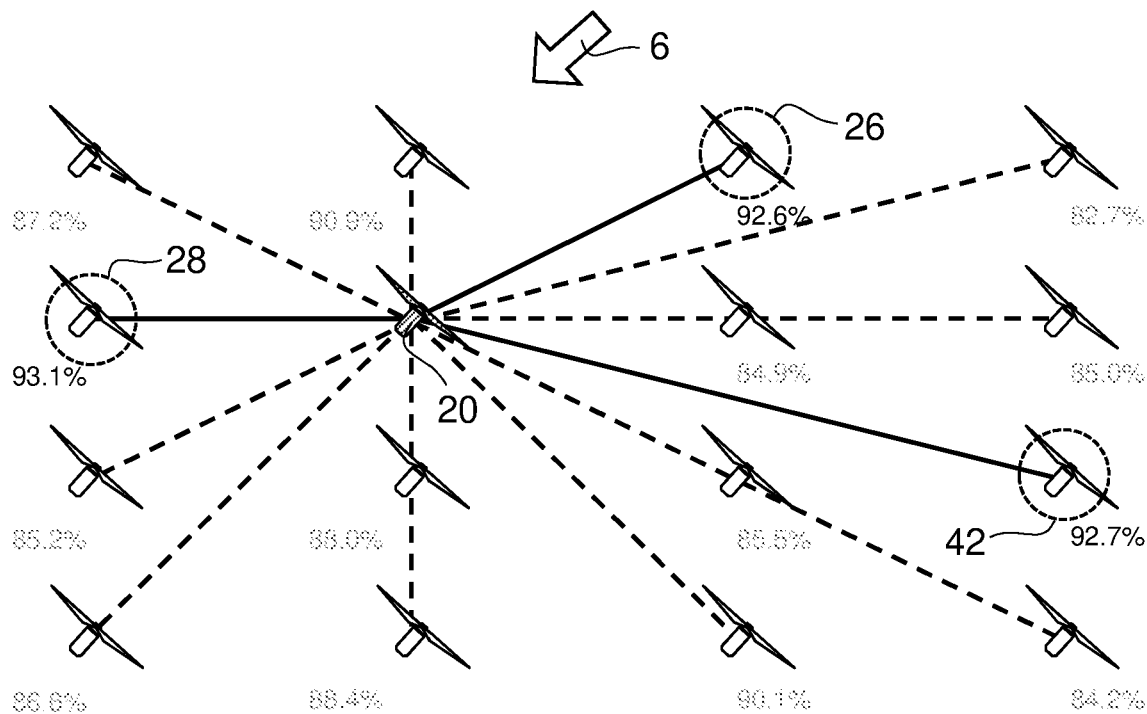
FIG. 5 shows the correlation strength between power output data of a selected turbine in the array of FIG. 3 with all other turbines in the array for a fourth wind direction.

FIG. 5 shows correlation values for the same array of turbines with the wind 6 from the North East. Correlation is again generally good across the array, but the best correlating turbines 26,28,42 are completely different from those identified in FIG. 4. This highlights not only the problem of a simple turbine-twinning approach to monitoring, but also the importance of the more global approach of the described method.

Figure 6:
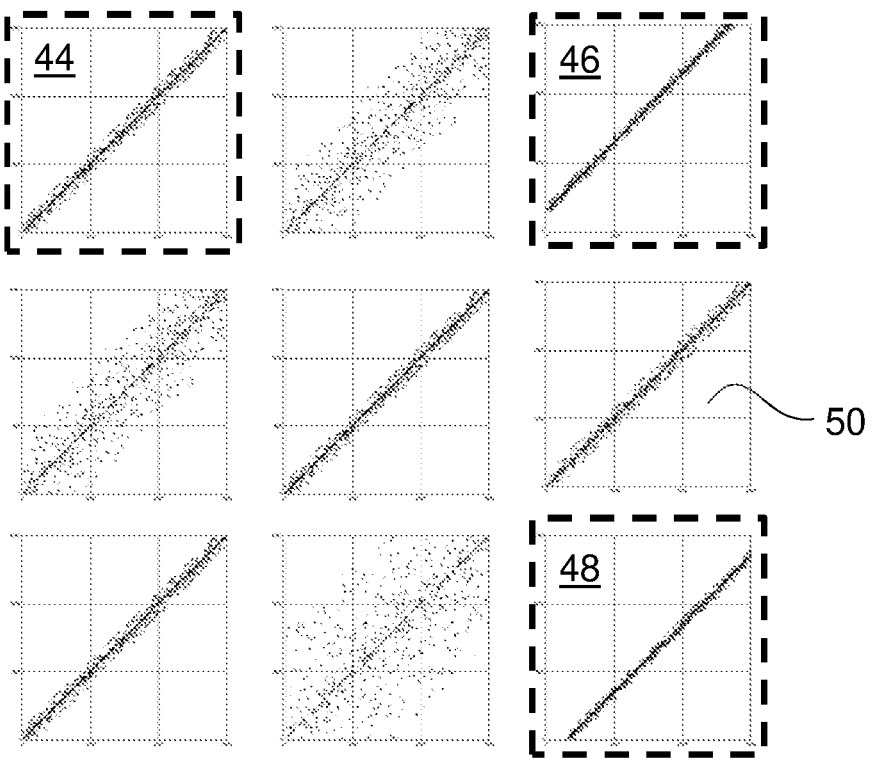
FIG. 6 shows a selection of graphs plotting the power output of the selected turbine in FIG. 5 against the power output of other turbines in the array.

Selected graphs showing the power output of the target turbine 20 plotted against the output of other turbines in the array of FIG. 5 are shown in FIG. 6. Once again, the best correlations 44,46,48 have been highlighted for reference. It should be noted that the strength of correlation within the data is more significant to the method than the direct comparison of the power outputs. For example, graph 50 shows that the power output of the two turbines under comparison is equivalent, but the correlation of the data within the plot is less strong than it is for graphs 46 and 48, both of which show a clear offset in power output.

The correlation strengths, once established for each turbine in a particular array, have been found to be repeatable and consistent for a certain wind direction. The power output values for a certain wind direction can therefore be used within a predictive model. A deep neural network (DNN) can be used to create a prediction value. Therefore, power outputs for several other turbines are used to obtain a predicted output for the target turbine 20. The iterative learning process of the DNN then repeatedly checks the predictive accuracy and adjusts or tunes the weightings until the predicted value converges with a measured value for the target turbine 20.

Flow charts relating to the training and operation of the predictive model are provided in FIGS. 7 to 10.

Figure 7:
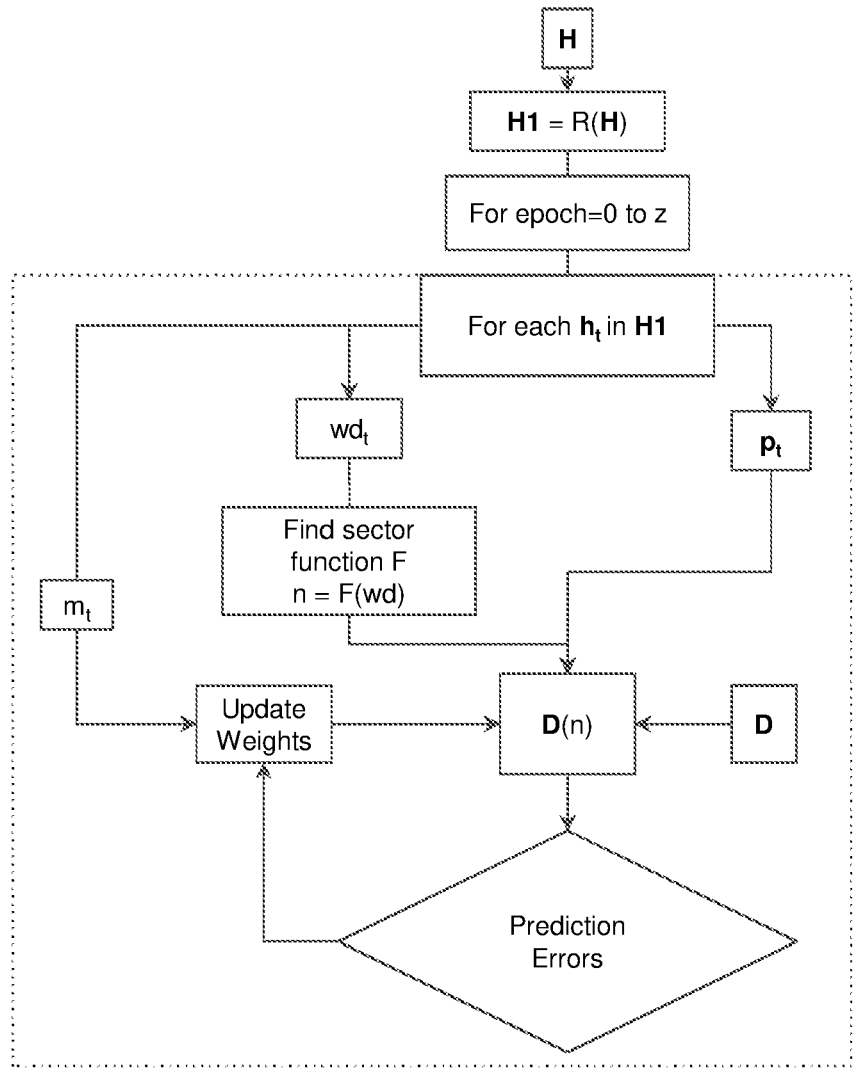
FIG. 7 shows a flow chart of the steps involved in training a neural network for use in the invention.

FIG. 7 illustrates a training process for building a prediction model for the power output for a single target turbine 20. An array of data H contains a number of vectors $h_t$ of historical data measured at a time t. Each historical vector $h_t$ contains values for measured turbine power $m_t$ for the target turbine 20, a scalar wind direction value $wd_t$ derived from a single or multiple wind direction measurements, and a vector of turbine powers $p_t$ for the other turbines all taken at time t, along with a time stamp $t_t$. H1 is a subset or sample of the historical vectors $h_t$ from H, obtained through a randomised sampling function R and representing around 50% of the total data in H.

The training process in FIG. 7 works by breaking down the 360° spread of possible wind directions into a number N of equal segments, where each segment spans an angle s of $2\pi/N$ radians for simplicity. Expanding on the simple model creating equal segments creates a 'wind rose' for which each segment n, from 1 to N, can be considered individually during modelling and analysis. Wind direction is binned (ie data is grouped by wind direction or segment of the wind rose) to create modes of operation for the model creation and subsequent prediction. The value of N can be set by a user, but will typically be in the range of 8 to 72. It is noted that it is entirely possible to define unequal segment sizes, covering 360°, tuning the model to take into consideration correlation variation for certain directional segments.

Once into the iterative part of the training, the wind direction value $wd_t$ is used to determine the correct segment n of the wind rose and pass this data together with the vector of historical turbine powers $p_t$ to an appropriate model D(n) from the DNN list D. The selected model D(n) takes an input vector of the various turbine powers $p_{t1}$, $p_{t2}$, $p_{t3}$, etc based on the identity of the target turbine 20 and wind direction $wd_t$. A prediction for the target turbine 20 is then produced by the DNN at D(n) and compared with the measured turbine power $m_t$ from the same historical vector $h_t$ to provide a prediction error. The weights in the selected model D(n) are updated based on the prediction error and the process is repeated then repeated for the next historical vector $h_t$ in the sample H1 until all historical vectors $h_t$ have been processed. The entire process is then repeated until either no prediction errors remain (indicating convergence in the values) or a pre-set number (for example 10000 or 100000) of epochs is reached.

The training process combines each turbine power through a number of layers within the DNN to predict the power output from a specific or target turbine 20, given a specific wind vector (direction).

An example DNN has an input layer, several hidden layers, an output layer, and a prediction node with as many activation nodes as inputs, plus a hidden bias which is left out of most DNN documentation to reduce complexity. The weights of a dense network are from every input to the first set of activation nodes. There are then hidden layers which also have as many activation nodes and are all connected to the preceding layer's activation nodes. Each connection has its own weight and each node also has a hidden bias. This continues until the output layer, where for a regression output, the output activation nodes (including hidden bias) are connected to a single output node. Again, each output activation connection has a weight. Another level of complexity may exist for the activation calculation, depending on which type of learning function is used, which in essence scales the dot product of weights and inputs for the activation calculation.

The deep learning employed in the invention allows weightings to be provided for each turbine dependent on measured power of the target turbine and wind direction. Non-linear relationships can be accommodated, such that the invention provides functionality well beyond a simple multiplication factor for a given wind direction.

It should be noted that networks other than dense networks could be used in the described method, such as, but not limited to, recurrent, convolutional, or long short-term memory (LSTM) networks with varying degrees of accuracy.

Figure 8:
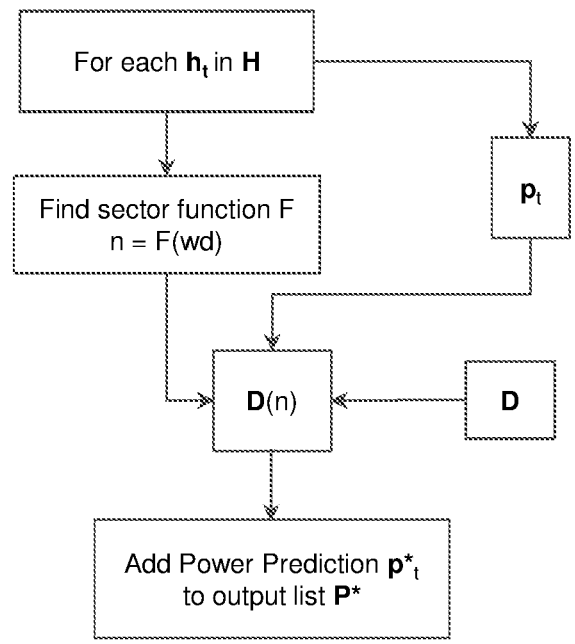
FIG. 8 shows a flow chart of the validation steps for the neural network.

FIG. 8 illustrates a validation step, where the trained DNN D can be checked for all vectors $h_t$ in the historical data H, including those not included in the randomised sample H1. An output vector P* of predicted powers is provided, with additional predictions $p^*_t$ for the vectors $h_t$ not included in the randomised sample H1 included. These predictions can then be compared with the corresponding measured power values to check the accuracy of the model. If the validation indicates that the accuracy of the model is outside acceptable limits, for example less than 99.8%, then the training step can be repeated. The randomised sampling factor R will provide an alternative base set of data for the training, and the number of epochs may be increased, by 1000 for example, to try and improve convergence. This process can be repeated as often as required to obtain a desired accuracy.

Figure 9:
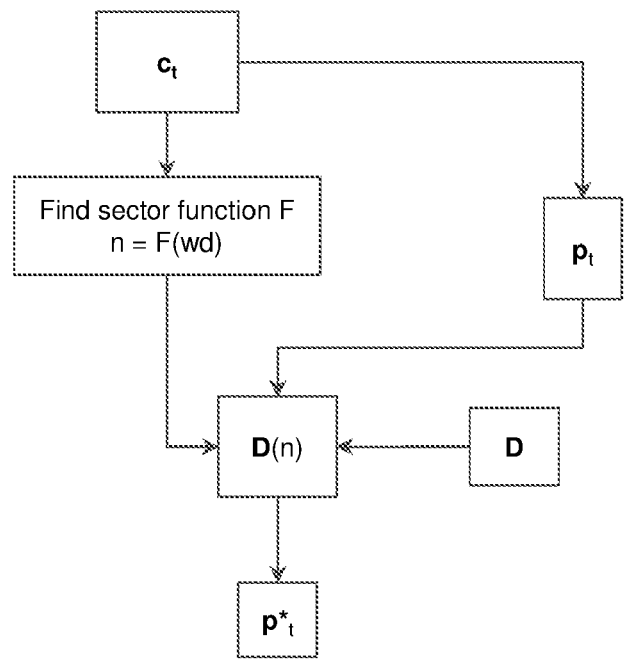
FIG. 9 shows a flow chart of the neural network in operation.

The operation of the system is fundamentally similar to the validation process, with the historical vectors $h_t$ replaced with live power monitoring data vectors $c_t$ from each wind turbine obtained in real time, as illustrated in FIG. 9. The output predicted power value $p^*_t$ from the model forms the basis of a comparison with the measured power to determine degradation of performance.

Each model D(n) used in the method is specific to a segment n of the wind rose, and can thus be referred to as a directionally binned hyper-twin model. It has the form of a DNN that can be densely connected with up to N input nodes whereby N is limited to the number of turbines in the array minus one. The wind directional bin size, as well as the DNN depth and height of each hidden layer are hyperparameters that can be optimised by trial and error. Each DNN has a single output node to ensure regression.

The output of a hyper-twin model is a predicted power at a given wind directional bin for a specific turbine, based on a multi-turbine power output multivariate-regression using DNN. Deep learning intrinsically eliminates the impact of certain inputs automatically where prediction errors are high, which is often as a result of data scarcity.

A residual of predicted minus actual power creates an indicator for degradation of performance. Any significant deviation from the expected yield for extended durations or with high recurring frequency can be raised as requiring remediation by the site engineering team.

Although as described the method considers power readings from all turbines other than the target turbine 20 when making the prediction, it is also possible that only a selected group or subset of turbines could be used.

For example, in FIG. 4 there are four turbines 24,34,38,40 which show a better correlation than the remaining turbines in the array. Focusing on the output of these four turbines 24,34,38,40 during training of the DNN and subsequent assessment of the target turbine 20 would reduce the amount of data being handled. All four turbines show greater than 91% correlation for the wind direction shown, suggesting that they are highly suitable for use in the comparison. The correlation data for all turbines in the array is acquired as an initial stage in the method described above, so the initial selection or filtering step can be performed simply by setting a threshold value for correlation strength and excluding turbines that do not meet that criteria.

This selection or filtering may result in different length vectors of turbine power $p_t$ in different wind directions. For example, if we were to apply the same 91% correlation threshold to the array as shown in FIG. 5, with the North East wind direction, then only three turbines 26,28,42 would remain in the analysis for the same target turbine 20 instead of the four turbines 24,34,38,40 from the FIG. 4 example, where the wind was from the North West. It will be understood, therefore, that the number of other turbines used to obtain a predicted output from a target turbine 20 may vary depending on one or both of the turbine location and the wind direction.

The examples described above would exclude all turbines showing a correlation below 91%, but the method could instead set a far lower threshold value. Although not an issue in the examples of FIG. 4 or 5, there may be turbines within a particular array that exhibit a very poor correlation with a particular target turbine for one or more wind directions. Setting a low threshold value may help to exclude any such turbines and avoid their relatively poor correlation slowing down the training of the DNN. Applying a correlation mesh should be faster than running data through a full DNN. The threshold may be based on $R^2$ value, for example.

Due to the functioning of the DNN, and the adjustment of weightings during training, a complete set of data from all turbines under consideration is likely to provide greater accuracy and more reliable predictions. However, in practice there is likely to be an optimum compromise between absolute precision and efficiency of training and the volume of data transfer required.

Figure 10:
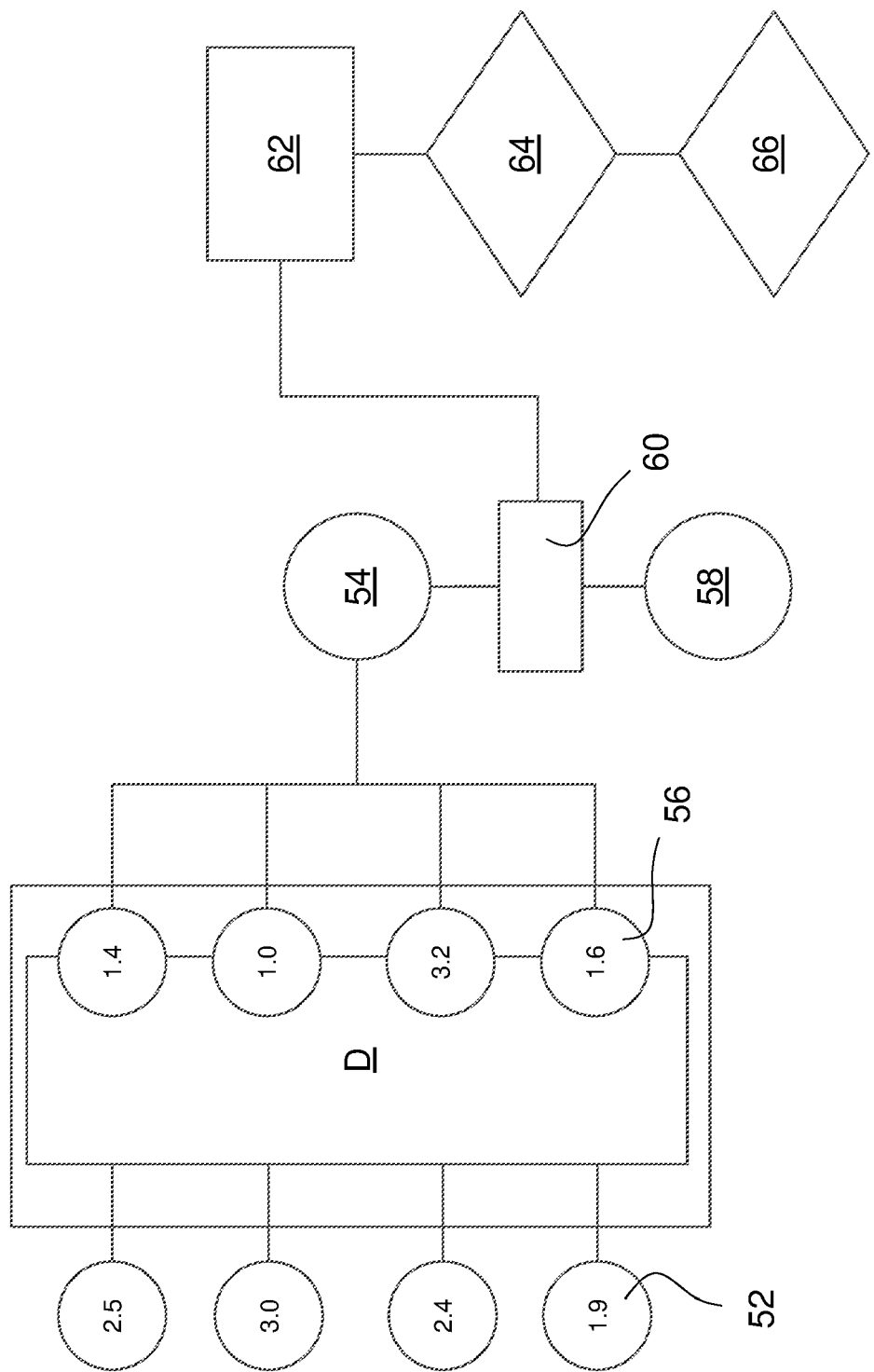
FIG. 10 shows a flow chart of the comparison step of the invention.

FIG. 10 shows the comparison step and the assessment of degradation for a given wind turbine. The simplified example in FIG. 10 shows measured power values 52 for only four turbines other than the target turbine, but it should be understood that power readings for a larger number of turbines could be provided to the DNN D in practice. The DNN D provides a predicted power value 54 based on these inputs 52 and DNN weightings, the final layer of which can be seen at 56 for comparison with a measured value 58 for the target turbine 20. If the comparison 60 shows a difference between the measured power 58 and predicted power 54 then this residual power value is used at 62 to create a performance deviation pd value for the target turbine 20. The performance deviation value pd is calculated as a percentage error based on the absolute error 60 divided by the predicted power 54. For example, if the predicted power 54 for a target turbine 20 is 2.7 MW and the measured power 58 is 2.6 MW, then the performance deviation value pd would be 0.1/2.7× 100%=3%. The performance deviation value pd is compared with a threshold value at 64. The accuracy of the prediction model means that the threshold value may be as low as 0.5%, but any suitable threshold value can be set. If the comparison at 64 shows that the performance deviation value pd is greater than the threshold value, then an alert can be raised and operational data such as yaw, pitch, curtailment, and ice potential can be checked and/or blade inspection or other maintenance can be scheduled.

Figure 11:
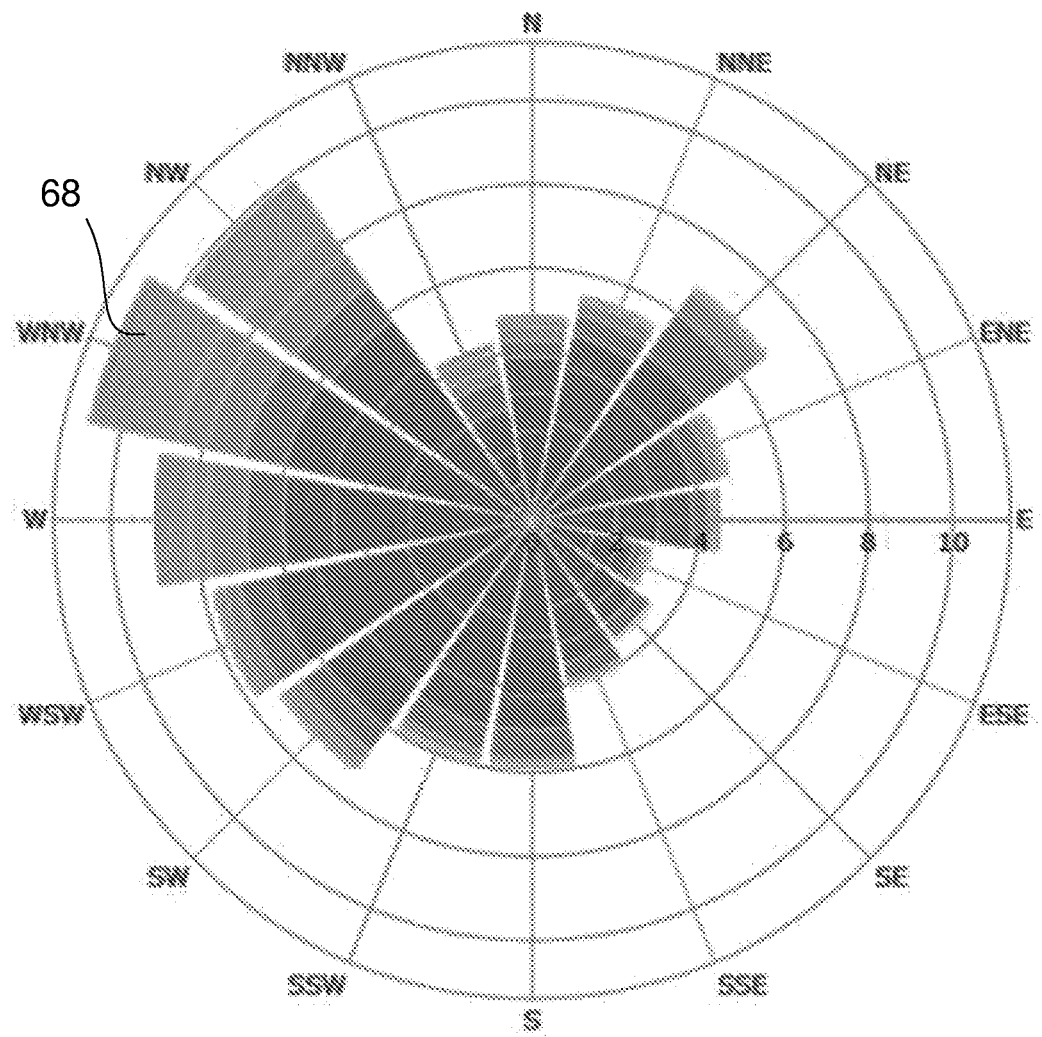
FIG. 11 shows an example set of the results for various wind directions.

FIG. 11 is a display of experimental results obtained during testing of the analysis method with La Haute Borne 2 MW turbines, showing the frequency and magnitude of residual power (predicted from actual power) by wind direction. The final bin for magnitude captures all residual power readings equal to or greater than 10 kW. The largest deviation 68 between the predicted power and the actual power recorded in FIG. 11 is in the WNW wind direction.

Subsequent analysis into the cause of the deviation found that blade pitch angle was out of normal operating ranges.

Pending further testing, the initial results confirm that the method could be used to detect losses as small as 0.5% of the test turbines' normal rated performance. There is no reason why losses of the same or similar absolute magnitude would not be detectable for larger wind turbines, so it is anticipated that performance losses of 0.2%, 0.1% or lower will be detectable in higher output (e.g. 12 MW) turbines using the same model.

The high accuracy and precision of the prediction model and method mean that it has been shown to be possible to detect general wear within turbine components, as well as more significant issues such as blade damage or misalignment.

The described method is particularly effective. Individual turbine power output is directly related to the instantaneous air mass flow, and turbines create a wake that can impact the performance of nearby turbines. However, turbines at somewhat unknown array positions experience very repeatable instantaneous air mass flow with respect to each other for different wind directions. Therefore, instantaneous turbine power outputs are directly correlated to one another. This makes wind direction a significant factor for correlating turbine performance according to the method described above.

Figure 12:
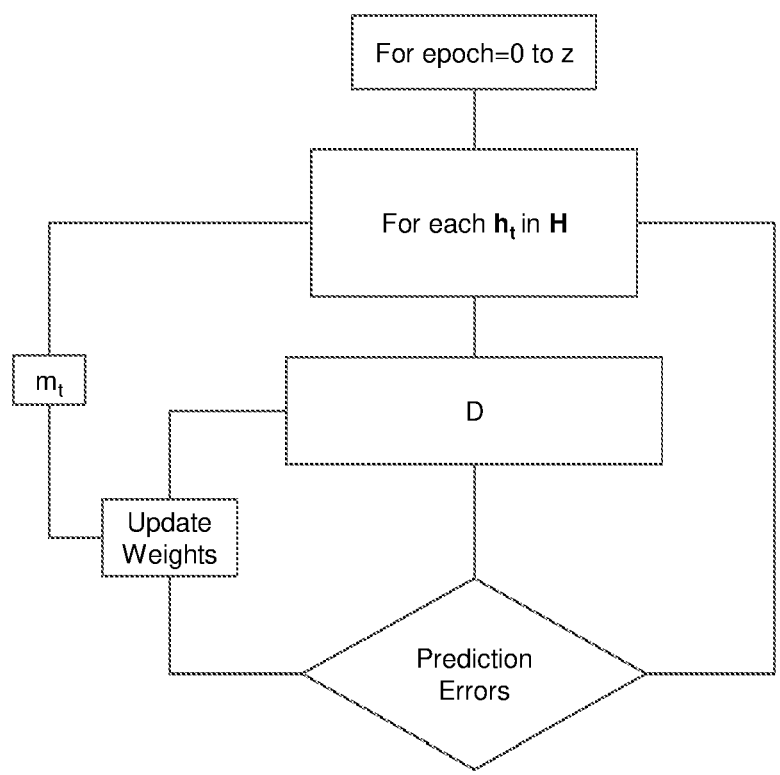
FIG. 12 shows a flow chart of the steps involved in an alternative method of training a neural network.

FIG. 12 shows an alternative, simplified, method for training a single DNN D. Unlike the previously described training illustrated in FIG. 7, the alternative method omits the step of grouping or binning each particular wind direction wd into a segment n of a wind rose, but the training method is otherwise similar to that described in relation to FIG. 7. Vectors $h_t$ from the data array H are considered in turn, with predictions being made using the DNN D and then compared with a measured power value $m_t$.

By not requiring different wind directions to be 'binned', the 'all directions' learning or training method of FIG. 12 requires fewer variables at the outset. The trade-off is that the source data tends to be noisier, and the DNN is required to consider a larger number of distinct wind direction models. The DNN may also encounter difficulties with the transition from 360° to 0° if working with absolute values. As a result, convergence is typically slower, meaning that a greater number of epochs will be required to reduce prediction errors to acceptable levels. This can be mitigated by increasing the amount of historical data H used, so this alternative method will perhaps be most suitable in situations where a greater amount of historical data is available.

Although specific embodiments are described above, it should be understood that they provided by way of example only, and are not intended to limit the scope of protection as defined with reference to the appended claims. Various modifications within the claim scope would be apparent to a skilled reader.

For example, the method/model could be used across multiple sites rather than being limited to a single localised turbine array or wind farm. This would allow single or very small wind farms to be monitored by inferring relationships from other farms found in meteorologically and topologically comparable environments.

The method was formulated from an initial realisation that turbine powers are directly related under specific wind direction and ambient conditions. Therefore, multivariate regression processes other than deep learning, for example simple multivariate regression, random sample consensus (RANSAC), regression trees etc, are feasible.

The method and model could also be used for general asset health monitoring, site production forecasting, wind farm planning, meteorological modelling, and instrument calibration. Although initially developed and described in relation to wind turbine monitoring, the model and method could also be used to determine performance changes for other forms of energy generation including, but not limited to, tidal turbines.

The model may include further functionality whereby a turbine within the array could act as a switch to remove certain turbines from consideration or to alter their influence within the model. For example, if a particular turbine is outputting a power in excess of a determined threshold, then this may trigger the model to remove one or more other turbines from the model.

There is also the potential to include one or more virtual turbines in the predictive model or calculation. This would be beneficial if two of the real turbines under consideration were to experience a corresponding drop in performance, perhaps from corresponding faults, that might otherwise be missed in the monitoring.

The invention claimed is:

1. A method for turbine fault or component degradation detection comprising:
   measuring the power output from a plurality of renewable energy turbines in an array,
   performing a comparison of the measured power output from a target turbine with a predicted value for the target turbine, wherein the predicted value is the result of a calculation based on the measured power output from a plurality of other turbines from the array and a predictive model which includes a weighting assigned to each of the plurality of other turbines based on the strength of correlation of their historical data with historical data from the target turbine,
   determining a performance change for the target turbine based on the comparison;
   outputting an alert signal indicative of a fault or component degradation if a performance change is determined; and
   causing repair, maintenance or inspection of the target turbine to be performed based on the alert signal;
   wherein a separate predictive model is provided for each of a plurality of defined wind directions, and wherein the method selects the predictive model that corresponds to the wind direction experienced by the target turbine.

2. The method according to claim 1, wherein the plurality of wind directions are defined as a predefined number of equal segments of a circle.

3. The method according to claim 1, wherein the calculation is performed using a Deep Neural Network.

4. The method according to claim 1, wherein the calculation is performed using simple multivariate regression, random sample consensus, or regression trees.

5. The method according to claim 1, wherein the plurality of other turbines includes all other turbines in the array.

6. The method according to claim 1, wherein the plurality of other turbines comprises only a subset of other turbines in the array.

7. The method according to claim 1, wherein the calculation is independent of wind speed and/or devoid of wind speed data as an input.

8. The method according to claim 1, further comprising an initial step of training the predictive model using historical data for the target turbine and for the plurality of other turbines.

9. A method for turbine fault or component degradation detection comprising:
- measuring the power output from a plurality of renewable energy turbines in an array,
- performing a comparison of the measured power output from a target turbine with a predicted value for the target turbine, wherein the predicted value is the result of a calculation based on the measured power output from a plurality of other turbines from the array and a predictive model which includes a weighting assigned to each of the plurality of other turbines based on the strength of correlation of their historical data with historical data from the target turbine,
- determining a performance change for the target turbine based on the comparison;
- outputting an alert signal indicative of a fault or component degradation if a performance change is determined; and
- causing repair, maintenance or inspection of the target turbine to be performed based on the alert signal;
- wherein the plurality of wind directions are defined as a predefined number of equal segments of a circle.

10. The method according to claim 9, wherein a separate predictive model is provided for each of a plurality of defined wind directions, and wherein the method selects the predictive model that corresponds to the wind direction experienced by the target turbine.

11. The method according to claim 10, wherein the plurality of wind directions are defined as a predefined number of equal segments of a circle.

12. The method according to claim 9, wherein the calculation is performed using a Deep Neural Network.

13. The method according to claim 9, wherein the calculation is performed using simple multivariate regression, random sample consensus, or regression trees.

14. The method according to claim 9, wherein the plurality of other turbines includes all other turbines in the array.

15. The method according to claim 9, wherein the plurality of other turbines comprises only a subset of other turbines in the array.

16. The method according to claim 9, wherein the calculation is independent of wind speed and/or devoid of wind speed data as an input.

17. The method according to claim 9, further comprising an initial step of training the predictive model using historical data for the target turbine and for the plurality of other turbines.

* * * * *